(12) United States Patent
Kim

(10) Patent No.: US 6,703,723 B2
(45) Date of Patent: Mar. 9, 2004

(54) DEVICE FOR SENSING AND BLOCKING FROTH IN A HOME MACHINE FOR MANUFACTURING SOYBEAN MILK, WATERY BEAN CURD, AND BEAN CURD

(76) Inventor: Hong-bae Kim, 5-7 Hyunchun-dong, Duckyang-ku, Koyang-shi, Kyunggi-do (KR)

( * ) Notice: Subject to any disclaimer, the term of this patent is extended or adjusted under 35 U.S.C. 154(b) by 0 days.

(21) Appl. No.: 10/131,192

(22) Filed: Apr. 25, 2002

(65) Prior Publication Data

US 2003/0141766 A1 Jul. 31, 2003

(30) Foreign Application Priority Data

Jan. 30, 2002 (KR) ........................................ 2002-2978 U

(51) Int. Cl.$^7$ ................................................. H02B 1/24
(52) U.S. Cl. ........................... 307/112; 307/31; 99/281; 73/304
(58) Field of Search ..................... 307/31, 112; 99/281; 73/304; 119/14.17

(56) References Cited

U.S. PATENT DOCUMENTS

| | | | | |
|---|---|---|---|---|
| 4,059,016 A | * | 11/1977 | Kitzinger et al. | ......... 73/304 R |
| 5,487,359 A | * | 1/1996 | Montreuil | ................. 119/14.17 |
| 5,699,239 A | * | 12/1997 | Komori | .................... 363/21.07 |
| 5,852,965 A | * | 12/1998 | Kim | ............................. 99/281 |
| 5,936,356 A | * | 8/1999 | Brault | ......................... 315/231 |
| 6,248,978 B1 | * | 6/2001 | Okuda | ......................... 219/216 |

* cited by examiner

Primary Examiner—Gregory J. Toatley, Jr.
Assistant Examiner—Robert L. Deberadinis
(74) Attorney, Agent, or Firm—Shlesinger, Arkwright & Garvey LLP

(57) ABSTRACT

Device for sensing and blocking froth in a home machine for manufacturing soybean milk, watery bean curd, and bean curd, which allows a heater not to be operated only when the home manufacturing machine contains froth, so as to remove froth, thereby preventing the machine from getting damaged. The apparatus includes a plurality of components installed in a body. The device includes: a ground electrode and a signal electrode electrically connected to two selected components, respectively. A controller is provided for outputting a control signal for removing the occurrence of froth when froth is sensed.

4 Claims, 3 Drawing Sheets

DEVICE FOR SENSING AND BLOCKING FROTH IN A HOME MACHINE FOR MANUFACTURING SOYBEAN MILK, WATERY BEAN CURD, AND BEAN CURD

BACKGROUND OF THE INVENTION

1. Field of the invention

The present invention relates to a device for sensing and blocking froth in a home machine for manufacturing soybean milk, Watery bean curd, and bean curd, and more articularly to a device for sensing and blocking froth in a home machine for manufacturing soybean milk, watery bean curd, and bean curl., which allows a heater not to be operated only when the home manufacturing machine contains froth, so as to remove froth, thereby preventing the machine from getting damaged.

2. Description of the Prior Art

A conventional method for domestic use which manufactures soybean milks, watery bean curds, and bean curds will be described herein below.

First, the soybeans are washed clean. The washed beans are then soaked and made swollen in the water for several hours to be easily pulverized. The swollen beans are pulverized by using a millstone or a mixer, so that raw bean juice is produced. The raw bean juice is divided into bean-curd refuse and protein juice using a fine sieve gin or cloth. The divided protein juice is put in a kettle or a receptacle and boiled. At this time, since froth inevitably forms and causes the kettle or receptacle to overflow, the protein juice is boiled while repeatedly and artificially adjusting thermal power with care so that the froth does not overflow. After boiling the protein juice enough, an addition such as sugar or salt is put in the boiled protein juice to manufacture potable soybean milk. Also, after boiling the protein juice enough, a predetermined amount of coagulating agent such as calcium sulfate or the like is added to the boiled protein juice. After the coagulating agent-added protein juice is stirred, when several minutes elapse, it becomes a watery bean curd. The watery bean curd is put in a forming device and compressed and formed to manufacture bean curd.

However, in the conventional method for domestic use which manufactures soybean milks, watery bean curds, and bean curds, since several processes are separately performed, it is inconvenient. Since the manufacturing process is complicated and it takes a lot of time, the conventional method is inefficient. In particular, it takes a lot of time to make the beans swell. It is difficult to suitably adjust the amount of beans. The recovery rate of the protein juice is relatively low and it is difficult to manage a clean status.

In order to solve such problems, apparatuses capable of simply and conveniently manufacturing soybean milks, watery bean curds, and bean curds are proposed. Hereinafter, such conventional apparatus for domestic use which manufactures soybean milks, watery bean curds, and bean curds will be described with reference to FIG. 1.

FIG. 1 is a sectional view for showing a conventional apparatus for domestic use which manufactures soybean milks, watery bean curds, and bean curds. As shown in FIG. 1, the conventional apparatus includes a body 1, a driving motor 2, a short driving shaft 3, a long driving shaft 4, a knife edge 5, a heater 6, and a temperature sensor 7. A cover is installed at a upper portion of the body 1. The body 1 is opened and closed by the cover. The driving motor 2 is installed at the cover of the body 1. When a power is applied to the driving motor 2, the driving motor 2 provides a rotating power. The short driving shaft 3 serves as a rotary shaft of the driving motor 2. The long driving shaft 4 is detachably fitted to the shorter driving shaft 3. The knife edge 5 is connected to an end portion of the long driving shaft 4. The heater 6 heats contents included in the body 1. The temperature sensor 7 senses a heating temperature of the contents included in the body 1.

An operation of the conventional apparatus for domestic use which manufactures soybean milks, watery bean curds, and bean curds will now be explained.

When a user puts beans and water into the interior of the body 1 and inputs a power to a controller (not shown), the controller operates the driving motor 2. Then the driving motor 2 controls the knife edge 5 to pulverize the beans and water. The controller operates the heater 6 and the temperature sensor 7 to perform a series of processes, in which the beans and water are heated at a predetermined temperature, so that the soybean milks, watery bean curds, and bean curds are sequentially manufactured.

However, in the conventional apparatus for domestic use which manufactures soybean milks, watery bean curds, and bean curds, if a user operates the conventional apparatus in a state in which the froth forms and overflows during the manufacturing process, the contents included in the body are spoilt and the conventional apparatus gets damaged.

SUMMARY OF THE INVENTION

Accordingly, the present invention has been made to solve the above-mentioned problems occurring in prior art devices.

An object of the present invention is to provide a device for sensing and blocking froth formation in a home machine for manufacturing soybean milk, watery bean curd, and bean curd, which machine allows a heater not to be operated only when the home manufacturing machine contains froth, so as to prevent the occurrence of froth, thereby preventing the machine from getting damaged.

In order to accomplish this object, there is provided a device for sensing and blocking froth in an apparatus for manufacturing soybean milk, watery bean curd, and bean curd.

The inventive apparatus may be in domestic use, the apparatus including a plurality of components installed in a body.

The inventive device may include a ground electrode and a signal electrode electrically connected to two selected ones of_a plurality of components, respectively. Specifically, the device may include a first resistor connected to the signal electrode; a first switching transistor connected to the first resistor; a controller connected to the first switching transistor for outputting a control signal for blocking froth formation when the froth is sensed; a second resistor connected to the controller; a second switching transistor connected to the second resistor; a heater coil connected to the second switching transistor; and a third switching transistor connected to the second switching transistor.

In a further embodiment, the device for manufacturing soybean milk, watery bean curd, and bean curd may include a ground electrode and a signal electrode which may be electrically connected to a heater and a temperature sensor for sensing and blocking froth which forms and overflows during the manufacturing process in conventional devices.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
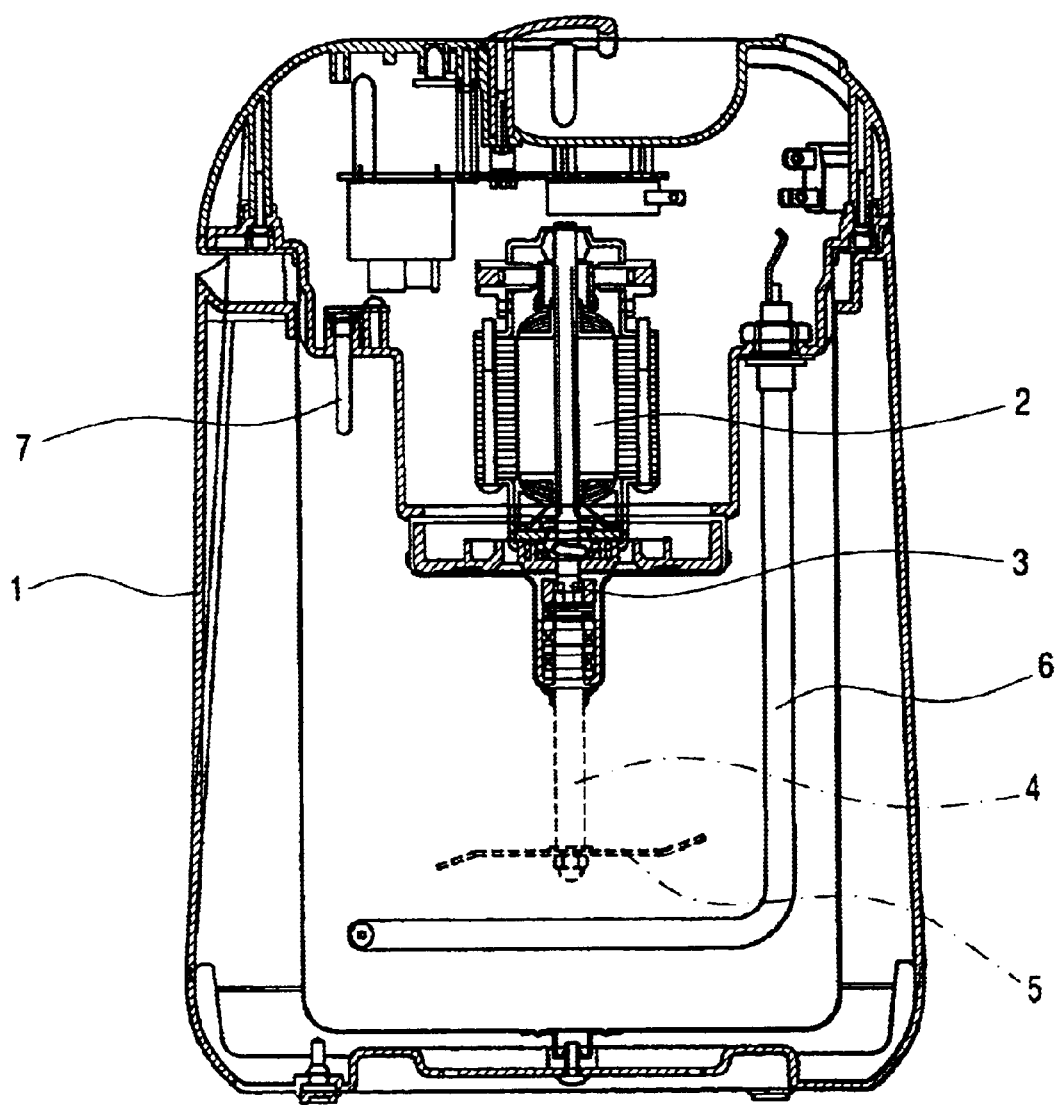
FIG. 1 is a sectional view showing a conventional PRIOR ART apparatus for domestic use which manufactures soybean milks, watery bean curds, and bean curds.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
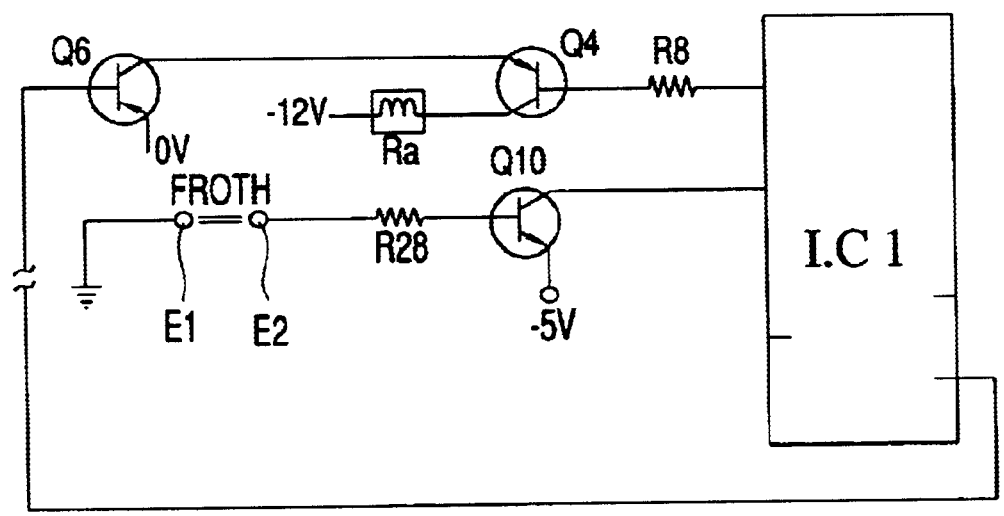
FIG. 2 is a circuitry diagram which shows a device for sensing and blocking froth in a home machine for manufacturing soybean milk, watery bean curd, and bean curd according to an embodiment of the present invention.

A device for sensing the froth in soybean milk, watery bean curd, and bean curd manufacturing apparatus for domestic use and generating a blocking signal indicative of the sensed result will be explained herein referring to FIG. 2 below. FIG. 2 is a circuitry diagram which shows the device for sensing and blocking froth in a home machine for manufacturing soybean products including soybean milk, watery bean curd, and bean curd according to an embodiment of the present invention.

As shown in FIG. 2, the device includes a ground electrode E1, a signal electrode E2, a resistor R28, a switching transistor Q10, a controller I.C1, a resistor R8, a switching transistor Q4, a heater coil Ra and a switching transistor Q6. The ground electrode E1 and the signal electrode E2 are connected to two selected components installed in a body 1, respectively. The resistor R28 is connected to the signal electrode E2. The switching transistor Q10 is connected to the resistor R28. The controller I.C1 is connected to the switching transistor Q10. The controller I.C1 outputs a control signal for blocking froth when the froth is sensed. The resistor R8 is connected to the controller I.C1. The switching transistor Q4 is connected to the resistor R8. The heater coil Ra is connected to the switching transistor Q4. The switching transistor Q6 is connected to the switching transistor Q4. Hereinafter, an operation of the device for sensing and blocking froth in a home machine for manufacturing soybean milk, watery bean curd, and bean curd according the present invention will be described.

When a user puts beans and water into the interior of the body 1 and inputs a power to a controller I.C1, the controller 5I. C1 operates the driving motor 2. Then the driving motor 2 controls the knife edge 5 to pulverize the beans and water. The controller operates the heater 6 and the temperature sensor 7 to perform a series of processes, in which the beans and water are heated at a predetermined temperature, so that the soybean milks, watery bean curds, and bean curds are sequentially manufactured.

When the heater 6 is operated during manufacturing process of soybean milks, watery bean curds, and bean curds, the controller I.C1 judges whether or not froth is generated in the interior of the body 1 in response to a signal inputted from the signal electrode E2 through the resistor R28 and the switching transistor Q10.

When the froth is present in the interior of the body 1, the ground electrode E1 and the signal electrode E2 are electrically connected to each other by means of the froth. Accordingly, a ground electric potential is applied to a base of the switching transistor Q10 to turn off the switching transistor Q10. When the froth is absent in the interior of the body 1, the ground electrode E1 and the signal electrode E2 are electrically disconnected from each other. Accordingly, a non-ground electric potential is applied to the base of the switching transistor Q10 to turn on the switching transistor Q10.

Figure 3:
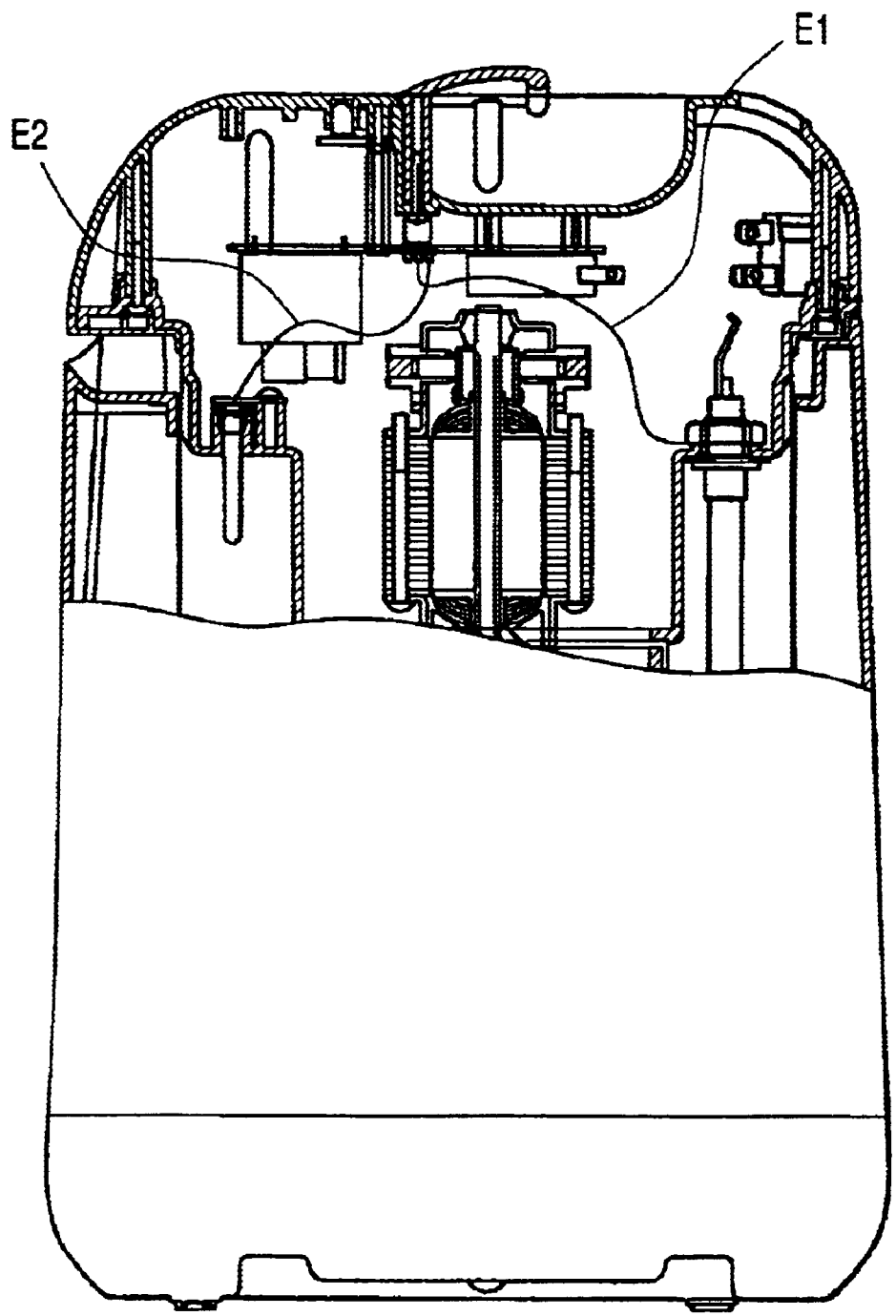
FIG. 3 is a sectional view showing a device having two electrodes which are electrically connected to a heater and a temperature sensor, respectively, which senses froth in soybean milk, watery bean curd, and bean curd manufacturing apparatus for domestic use and generates a block signal indicative of the sensed result according to the present invention.

The ground electrode E1 and the signal electrode E2 are used in connection with two selected components installed in the body, respectively. FIG. 3 shows device having the ground electrode E1 and the signal electrode E2 which are electrically connected to two selected components in the body 1. As shown in FIG. 3, the ground electrode E1 and the signal electrode E2 which are electrically connected to a heater 6 and a temperature sensor 7 respectively.

When the froth is present between the ground electrode E1 and the signal electrode E2, the switching transistor Q10 is turned off. Accordingly, the controller I.C1 drives the switching transistor Q4 connected to an output terminal of the controller I.C1. The switching transistor Q4 drives and does not operates the heater coil Ra inserted into the heater 6 to remove the occurrence of the froth.

As mentioned above, the present invention can provide an apparatus for sensing and blocking froth present in a machine for manufacturing soybean milk, a watery bean curd, and a bean curd, which allows a heater not to be operated only when the home manufacturing machine contains froth, thereby preventing the machine from getting damaged. The present invention can be applied and used in an apparatus field which manufactures soybean milks, watery bean curds, and bean curds, without departing from the scope and spirit of the invention.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for manufacturing soybean products including soybean milk, watery bean curd, and bean curd, the apparatus comprising:
   a) a body;
   b) a heater provided in the body, the heater being configured for heating soybeans and water when soybeans and water are provided in the body; and
   c) a device provided for sensing froth and for blocking froth formation, the device including:
      i) a ground electrode and a signal electrode, the ground electrode and the signal electrode being electrically connected to each other when the froth is present between the ground electrode and the signal electrode, and the ground electrode and the signal electrode being electrically disconnected from each other when the froth is absent from between the ground electrode and the signal electrode;
      ii) a first resistor electrically connected to the signal electrode;
      iii) a first switching transistor electrically connected to the first resistor;

iv) a controller electrically connected to the first switching transistor, the controller outputting a control signal for blocking froth when froth is sensed by the froth electrically connecting the ground electrode and the signal electrode;
v) a second resistor electrically connected to the controller;
vi) a second switching transistor electrically connected to the second resistor;
vii) the heater being electrically connected to the second switching transistor; and
viii) a third switching transistor electrically connected to the second switching transistor.

2. An apparatus as in claim 1, wherein:
a) the ground electrode is electrically connected to the heater.
3. An apparatus as in claim 1, wherein:
a) the ground electrode is electrically connected to the body.
4. An apparatus as in claim 1, wherein:
a) a knife edge is provided in a lower portion of the body, and the knife edge is configured for pulverizing soybeans and water when soybeans and water are provided in the body; and
b) the signal electrode is provided in an upper portion of the body above the knife edge.

* * * * *